United States Patent [19]

Cheng et al.

[11] Patent Number: 4,705,767

[45] Date of Patent: Nov. 10, 1987

[54] SULFACTANTS IN ACID-PEPTIZED CATALYST COMPOSITIONS

[75] Inventors: Wu-Cheng Cheng, Columbia; Richard G. Donnelly, Bethesda, both of Md.

[73] Assignee: W. R. Grace & Co., New York, N.Y.

[21] Appl. No.: 941,672

[22] Filed: Dec. 15, 1986

[51] Int. Cl.$^4$ .................... B01J 21/04; B01J 21/12
[52] U.S. Cl. ............................... 502/167; 502/170; 502/172; 502/201; 502/263; 502/355; 502/527; 264/44
[58] Field of Search ............... 502/167, 172, 263, 355, 502/527, 170, 201; 264/44

[56] References Cited

U.S. PATENT DOCUMENTS

| | | | |
|---|---|---|---|
| 2,719,010 | 9/1955 | Erickson | 502/527 X |
| 3,060,132 | 10/1962 | Weeks et al. | 502/111 |
| 3,657,151 | 4/1972 | Noble | 502/172 X |
| 3,692,698 | 9/1972 | Riley et al. | 502/220 |
| 3,907,710 | 9/1975 | Lundsager | 502/262 |
| 3,977,999 | 8/1976 | Erickson | 502/230 |
| 4,018,706 | 4/1977 | Inoue et al. | 502/211 X |
| 4,113,661 | 9/1978 | Tamm | 502/211 |
| 4,149,992 | 4/1979 | Mount et al. | 502/209 |
| 4,510,263 | 4/1985 | Pereira et al. | 502/314 |

FOREIGN PATENT DOCUMENTS 2351071 12/1977 France .

*Primary Examiner*—Patrick P. Garvin
*Attorney, Agent, or Firm*—Edward J. Cabic

[57] ABSTRACT

Surface active agent added to an acid-peptized alumina catalyst paste preserves macropores in the calcined particle.

20 Claims, No Drawings

SULFACTANTS IN ACID-PEPTIZED CATALYST COMPOSITIONS

CROSS-REFERENCE TO RELATED APPLICATION

U.S. Ser. No. 927,197, filed Nov. 5, 1986, Suarez and Cheng, Method and Apparatus for Sizing Porous Extruded Materials, discloses compositions similar to those herein.

SUMMARY OF THE INVENTION

The invention is directed to an improvement in the preparation of alumina and silica-alumina catalysts, particularly those intended for catalytic reactions where the rate of reaction is influenced by the slow process of molecular diffusion. The catalyst extrusion pastes are prepared by acid-peptization (to obtain good rheological properties) in the known way. The improvement described in this invention consists in adding a surface active agent or a surfactant (these terms are used interchangeably throughout the text) to the paste during mixing. The addition is conveniently made to the acid-peptizing solution. The paste is then extruded, dried, and calcined in the conventional known way. The use of the surface active agent results in the preservation of a macropore structure in the calcined catalytic material. Macropores (defined as pores greater than 600 Angstroms) are substantially absent (typically less than 10% of pore volume) in the calcined material if the surface active agent is omitted. The surface active agent also lowers viscosity of the paste, gives a smoother extrudate texture, and facilitates extrusion and cutting of the extruded product.

The invention is particularly useful in making small (less than 1/32 inch) diameter extrudates, and extrudates of complex cross-section, such as hollow cylinders and radial-vaned catalyst pellets of the type described in U.S. Pat. No. 3,907,710 (Lundsager) and 4,510,263 (Pereira et al).

DESCRIPTION OF THE PREVIOUSLY PUBLISHED ART

French Pat. No. 2,351,071, of Dec. 9, 1977 discloses various additives (methyl cellulose, tall oil) as extrusion aids for alumina catalysts. A peptizing agent is not used in preparing the alumina paste.

Peptization of alumina pastes for "de-clumping" and improved rheology is known. See U.S. Pat. No. 4,113,661 (Tamm).

It is known to extrude complex shapes of catalyst pastes. See, e.g., U.S. Pat. Nos. 3,907,710 (Lundsager) and 4,510,263 (Pereira et al).

None of the aforesaid patents show acid-peptized pastes containing a surface active agent.

Macroporosity

A number of catalytic processes require solid porous particles such as alumina or silica-alumina. Typical of such processes are hydroprocessing of residuum (from petroleum) for the removal of sulfur, nickel, and vanadium; and in automotive emission control for removal of carbon monoxide and hydrocarbons. The former is a multi-phase (gas-liquid) operation; the latter is in the gas phase. Under certain conditions the rate of both of the above reactions may become limited by diffusion. Incorporating a substantial volume of macropores into the catalyst particles will increase the effective diffusivity and allow the reaction to proceed at an acceptable rate. In hydroprocessing of residuum the higher diffusivity would permit a greater utilization of the catalyst pore volume in storing nickel and vanadium deposits. In this art, macropores are understood to be pores of at least 600 Angstroms in diameter, and with typical alumina-based catalysts the macropore diameters are in the range of 1000 to 100,000 Angstroms.

Porosity in a typical alumina catalyst is formed in the following manner. One starts with alumina powder. This powder consists of grains about 1 to 100 microns in diameter. Each grain consists of contiguous crystallites. The interstices between the crystallites are what constitute micropores, which have a diameter of typically 250 Angstroms or smaller. These interstitial capillaries in the aggregate have an extremely high surface area, and within these capillaries most of the catalytic reaction takes place.

In order to facilitate rapid diffusion of the reactants into these capillaries, somewhat wider feeder channels must be provided, leading to the capillaries. Ideally, these feeder channels are formed by preparing the catalyst paste in such a way that when the paste is extruded, dried, and calcined, the component grains will be found barely touching each other, somewhat like marbles in a box. In this highly desirable configuration the interstices between the alumina grains inherently and automatically provide the wider channels, at least 600 Angstroms in diameter, resulting in ideal macroporosity.

Simple wet mulling of the alumina grains will not provide the paste with enough lubricity to be extruded into catalyst particles of small dimensions or complicated shapes. Addition of a small amount of acid to alumina helps to "dissolve" the surface layer of the alumina grains and allow the paste to flow more easily. Acid-peptization is routine, and this is shown in Examples 1 and 2. Acid peptization does indeed provide good lubricity to the paste. However, after extrusion, drying, and calcining, we have found great loss of macropores. For some catalytic uses, such loss is immaterial, however, as above noted, retention of macropores is essential for diffusion-limited catalytic reactions.

Our invention solves the problems of retaining macroporosity in acid-peptized alumina and silica-alumina catalysts. We accomplish this by adding a surface active agent to the paste, suitably along with the acid-peptizing agent. Stated another way, we retain the advantages of acid peptization without loss of macropores in the calcined product.

Macropores should not constitute 100% of porosity. If this were so, total surface area of the catalyst particle would be severely reduced. Our process preserves a balance between macropores and micropore (i.e., pores less than 600 Angstroms, typically 250 Angstroms or smaller). As noted, most of the reaction takes place in the micropores, and a substantial volume of micropores must be available for this purpose. Our process will provide 10 to 50% of the total pore volume as macropores, with the balance as micropores. This range gives excellent results for most diffusion limited reactions.

The following examples illustrate without limiting the invention.

EXAMPLE 1 (Control)

"Standard Paste" Without Surface Active Agent

Three hundred grams of alumina as described in U.S. Pat. No. 4,154,812 and available commercially from W. R. Grace & Co. as Davison's SRA alumina, was mulled in a laboratory mix muller with a peptizing solution containing 16.3 ml of concentrated $HNO_3$ in 265 ml of water (0.1 mole of acid per mole of alumina) until the paste reached a consistency like that of a cookie dough. Thereafter, 13.4 ml of concentrated $NH_4OH$ was added and the paste was mulled for an additional ten minutes.

EXAMPLE 2 (Control)

The procedure of Example 1 was followed except that the peptizing solution was 9 g of $Al(NO_3)_3 \cdot 9H_2O$ (3% based on alumina), in 230 ml of water.

EXAMPLE 3

"Standard Paste" with 0.5% Surface Active Agent

The procedure of Example 1 was followed except that 1.5 g of a surfactant, 2,4,7,9-tetramethyl-5-decyne-4,7-diol, available commercially as Surfynol 104 from Air Products, Allentown, PA, was added to the peptizing solution. This amounted to 0.5% of surface active agent based on the weight of alumina.

EXAMPLE 4

"Standard Paste" with 2% Surface Active Agent

The procedure of Example 1 was followed except that 6 g (2% of the amount of alumina) of 2,4,7,9-tetramethyl-5-decyne-4,7-diol was added to the peptizing solution.

EXAMPLE 5

"Standard Paste" with 0.5% Surface Active Agent

The procedure of Example 2 was followed except that 1.5 g (0.5% based on the alumina) of 2,4,7,9-tetramethyl-5-decyne-4,7-diol was added to the peptizing solution.

The immediate effect of the surfactant (Examples 3, 4 and 5) is to decrease the shear viscosity of the extrusion mix. This makes extrusion easier and facilitates cutting the extrudate, which is particularly advantageous when forming extrudates of small diameter and/or complicated cross section.

EXAMPLE 6

Each of the paste products of Examples 1-5 was extruded through a 1/20-inch diameter die as a solid cylinder, broken into roughly ¼-inch long pellets, dried, and calcined at 1600° F. for 2 hours. The porosity of the pellets was then measured. As shown in Table 1, there are less than 10% macropores in the product of Examples 1 and 2, but the products of Examples 3, 4, and 5 show substantial macroporosity. With respect to the total pore volume in those three examples, 18 to 28% are pores greater than 600 Angstroms. The difference in the two sets of examples is due to the use of surface active agent.

EXAMPLE 7

The procedure of Example 4 was followed with the exception that the surface active agent used was an industrial detergent available as "Liquinox", a blend of aryl sulfonates, alkanolamide and nonylethenoxypoly(ethylenoxy) ethanol, manufactured by Alconox, Inc., of New York, N.Y. The Liquinox imparted the same rheological improvement to the extrusion mixture as did the 2,4,7,9-tetramethyl-5-decyne-4,7-diol, with good retention of macropores.

EXAMPLE 8

The procedure of Example 4 was followed with the exception that the surface active agent used was 1 wt % of an ethoxylated linear alcohol manufactured by the Shell Chemical Co. and available commercially as "Neodol". The pore properties of this extrudate are shown in Table 1. This sample contained 0.34 $cm^3/g$ macropore volume.

TABLE 1

| Example | Surface Active Agent (% of alumina) | Micropore Volume $cm^3/g$ | Macropore Volume $cm^3/g$ | Percent Macropore Volume |
|---|---|---|---|---|
| 1 | 0 | 0.67 | 0.05 | 7 |
| 2 | 0 | 0.58 | 0.06 | 9 |
| 3 | 0.5 | 0.67 | 0.15 | 18 |
| 4 | 2.0 | 0.67 | 0.27 | 28 |
| 5 | 0.5 | 0.63 | 0.18 | 22 |
| 8 | 1.0 | 0.72 | 0.34 | 32 |

Pore volumes in Table 1 were obtained by mercury porosimetry, by a procedure standard in the art. In this method, the pressure of mercury is increased and the volume intruded into the sample is measured. The instrument used was a Micromeretics Autopore 9200. The pore volume distribution is obtained by relating the intrusion pressure to diameter (using a contact angle of 140°) and by differentiating the cumulative pore volume distribution.

The Catalyst Paste

The invention works with substantially any acid-peptized catalyst paste adapted to be extruded (or otherwise formed) into catalyst particles, dried, and calcined. Such pastes are well known. Their solid content is commonly finely divided catalyst-grade alumina, silica-alumina, or mixes of these. A liquid is added, and the solid and liquid are thoroughly mixed or mulled to form a paste, which may grade from thick to thin. To obtain thorough dispersion during mulling the solids may be peptized, for example, with an acid-reacting substance. Indeed, our invention works only in combination with such acid-peptized mixes. Such acid-reacting materials include nitric acid (Example 3), acid nitrates such as aluminum nitrate (Example 5), acetic acid, and formic acid. The acid peptized paste may be subsequently neutralized with ammonium hydroxide. Acid-peptized mixes typically contain 0.02 to 0.15 moles of acid per mole of $Al_2O_3$. Another way to measure acid is to add a sufficient amount to obtain a paste pH in the range of about 4 to 5. (At a pH lower than 4, the alumina tends to dissolve.) It is believed that the acid puts a plus charge on the particles, thereby causing them to repel each other to a degree. Solid content on an $Al_2O_3$ basis should be between 30 and 50% depending on the type of extrusion or pelletization intended.

The Surface Active Agent

The surface active agent (synonymous terms are surfactant and wetting agent) is not limited to any particular compound or type. Broadly speaking, agents from the three general classes of surface active agents are useful as follows.

Cationic: Fatty amines, quaternary ammonium compounds, aliphatic monocarboxylic acids, ethoxylated alkyl amines, polyvinyl pyridine, sulfoxonium, sulfonium, phosphonium, and iodonium compounds. See

*Cationic Surfactants*, E. Jungermann, Editor, Marcel Dekker, Inc., New York, NY (1970).

Anionic: Alkylated aromatics, acyclic monocarboxylic acids, fatty acids, sulfonated aromatics, alcohol sulfates, ether alcohol sulfates, sulfated fats and oils, and phosphonic acid salts. See *Anionic Surfactants*, Parts I and II, W.M. Linfield, Editor, Marcel Dekker, Inc., New York, NY (1976).

Nonionic: Polyoxyethylene alkylphenols, polyoxyethylene alcohols, polyoxyethylene alkylamines, polyoxyethylene alklamids, polyols and acetylenic glycols. See *Nonionic Surfactants*, M. J. Schick, Editor, Marcel Dekker, Inc., New York, NY (1966).

For applications where alkali metals or sulfates would be detrimental to the catalytic activity, nonionic surfactants are preferred.

Mechanism of Macropore Retention

What follows is simply our theory, but it is consistent with our observations.

Reference is made to Example 1, which uses no surface active agent. Peptization "de-clumps" the alumina grains and the mass now consists of individual grains that barely touch each other. If the paste could be dried and calcined in this configuration, the interstices between the grains (macropores) would be retained. Such however is not the case. Due to the surface tension of the water, during drying the grains tend to cling together tightly, and largely to close the interstices, destroying a goodly portion of the macropores. Micropores, however, are not affected. The same observations apply to Example 2 (acid-peptized, but no surfactant).

Refer now to Example 3 (acid-peptized plus surfactant). Addition of the surface active agent produces a very interesting result. As in Examples 1 and 2, the grains are peptized and they contact each other as individual grains, at various points, thereby providing interstial volume. However, in Example 3 (and 4, 5, 7, and 8), each grain is coated with surface active agent. During drying, this coating lowers the surface tension of the water and holds the grains apart, and this structure is automatically preserved in Examples 3–5 and 7–8, by reason of the addition of the surface active agent in the paste. The step of calcining is therefore thought not to create the macropores, but rather simply retains them substantially unchanged from the greenware (the extruded shapes).

The process of adding a surfactant to an acid-peptized catalyst paste is believed novel, as is the process of extruding such paste and forming catalyst particles from the extrudate.

We also believe that our invention results in novel compositions of matter, including (Group I) the compositions that result from adding a surfactant to an acid-peptized catalyst paste, and (Group II) greenware made from the compositions of Group I.

With regard to Group I, these pastes consist essentially of:

(A) grains of alumina, silica-alumina, or mixes of these, about 1 to 100 microns in diameter; said grains consisting essentially of microporous crystallites, said grains being coated with a surface active agent; the interstices between said grains measuring (in average diameter) greater than 600 Angstroms; and (B) aqueous acid.

The aforesaid grains are typically 1 to 100 microns in diameter and have micropores typically 250 Angstroms in diameter or smaller. The insterstices between grains are typically between 1000 and 100,000 Angstroms in size.

Group II (greenware) is simply the result of forming Group I paste into a shape for drying and calcining. This is typically done by extrusion, followed by either cutting the extruded strand into desired lengths or allowing the strands to break to their natural lengths. The formed product will be identical in composition to the respective paste of Group I.

In further processing the greenware the surface active agent is removed during routine drying. An exception may be surfactants which contain non-volatile components (e.g. sulfates, phosphates, sodium) which may react with the grains to form aluminum sulfate, aluminum phosphate, sodium aluminate or sodium silicate, as the case may be.

It is understood that the foregoing detailed description is given merely by way of illustration and that many variations may be made therein without departing from the spirit of this invention.

What is claimed is:

1. In the preparation of a catalyst, comprising admixing a member of the group selected from powdered alumina, powdered silica-alumina, and mixtures thereof, with an acidic peptizing agent, forming a paste from the peptized group member, extruding the paste to form an extrudate, and calcining the extrudate to form a porous catalyst product, the improvement comprising admixing said paste with a surface active agent prior to extrusion, thereby to provide macropores in the porous catalyst product.

2. Method according to claim 1 in which the group member is powdered alumina.

3. Method according to claim 1 in which the acidic peptizing agent is a member selected from the group selected from nitric acid, aluminum nitrate, formic acid, and acetic acid.

4. Method according to claim 1 in which the surface active agent is a member selected from the group consisting of acetylenic glycols, polyoxyethylene alcohols, polyoxyethylene alkylamines, polyoxyethylene alkylamides, polyols, and fatty amines.

5. Method according to claim 4 in which the acetylenic glycol is 2,4,7,9-tetramethyl-5-decyne-6,7-diol.

6. Method according to claim 4 in which the surface active agent is 0.1 to 5% of the weight of the powdered catalyst group member.

7. Method according to claim 1 in which the macropores are 10 to 50% of the porosity in the porous catalyst product.

8. Paste composition consisting essentially of acid-peptized member of the group selected from powdered alumina, powdered silica-alumina, and mixtures thereof, and a surface active agent.

9. Composition according to claim 8 in which the group member is alumina.

10. Composition according to claim 8 in which the surface active agent is a member selected from the group consisting of acetylenic glycols, polyoxyethylene alcohols, polyoxyethylene alkyl amines, polyoxyethylene alkylamides, polyols, and fatty amines.

11. Composition according to claim 8 in which the surface active agent is 0.1 to 5% of the weight of powdered catalyst group member.

12. Composition according to claim 10 in which the surface active agent is 2,4,7,9-tetramethyl-5-decyne-4,7-diol.

13. Composition according to claim 8 in which the acid is nitric acid.

14. Extruded greenware consisting essentially of acid-peptized member of the group selected from powdered alumina, powdered silica-alumina, and mixtures thereof; and a surface active agent.

15. Greenware according to claim 14 in which the group member is alumina.

16. Greenware according to claim 14 in which the surface active agent is a member selected from the group consisting of acetylenic glycols, polyoxyethylene alcohols, polyoxyethylene alkylamines, polyoxyethylene alkylamides, polyols, and fatty amines.

17. Greenware according to claim 14 in which the surface active agent is 0.1 to 5% of the weight of the powdered catalyst group member.

18. Greenware according to claim 17 in which the surface active agent is an acetylenic glycol.

19. Greenware according to claim 18 in which the acetylenic glycol is 2,4,7,9-tetramethyl-5-decyne-4,7-diol.

20. Greenware according to claim 19 in which the acid is nitric acid.

* * * * *